(12) United States Patent
Lo

(10) Patent No.: US 10,465,818 B2
(45) Date of Patent: Nov. 5, 2019

(54) FAUCET CONNECTOR

(71) Applicant: Yuan Mei Corp., Chang Hua Hsien (TW)

(72) Inventor: Shun-Nan Lo, Chang Hua Hsien (TW)

(73) Assignee: Yuan Mei Corp., Chang Hua Hsien (TW)

( * ) Notice: Subject to any disclaimer, the term of this patent is extended or adjusted under 35 U.S.C. 154(b) by 27 days.

(21) Appl. No.: 15/659,755

(22) Filed: Jul. 26, 2017

(65) Prior Publication Data
US 2019/0032812 A1    Jan. 31, 2019

(51) Int. Cl.
| | | |
|---|---|---|
| *F16K 31/53* | (2006.01) | |
| *F16K 5/04* | (2006.01) | |
| *F16K 31/60* | (2006.01) | |
| *F16L 41/03* | (2006.01) | |
| *F16K 11/22* | (2006.01) | |
| *F16K 11/20* | (2006.01) | |
| *E03C 1/02* | (2006.01) | |

(52) U.S. Cl.
CPC ............ *F16K 31/535* (2013.01); *E03C 1/023* (2013.01); *F16K 5/0407* (2013.01); *F16K 5/0442* (2013.01); *F16K 5/0478* (2013.01); *F16K 11/20* (2013.01); *F16K 11/22* (2013.01); *F16K 31/60* (2013.01); *F16L 41/03* (2013.01); *E03C 2201/30* (2013.01)

(58) Field of Classification Search
CPC ........ F16K 11/22; F16K 31/535; F16K 31/60; F16K 5/0407; F16K 5/0442; F16K 5/0478; F16L 41/03; Y10T 137/87877
See application file for complete search history.

(56) References Cited

U.S. PATENT DOCUMENTS

| | | | | |
|---|---|---|---|---|
| 1,506,433 A | * | 8/1924 | Knauf .................... | F16K 27/08 251/248 |
| 3,026,905 A | * | 3/1962 | Nilsson ................... | F16K 11/22 137/596 |
| 4,078,440 A | * | 3/1978 | Dalton .................... | F16K 31/05 74/89.45 |
| 4,144,774 A | * | 3/1979 | Berlinger, Jr. ........ | F16H 19/001 251/249 |
| 4,350,322 A | * | 9/1982 | Mueller ................ | F16K 31/502 137/556 |
| 4,776,363 A | * | 10/1988 | Avelli ...................... | E03B 9/04 137/272 |
| 4,911,029 A | * | 3/1990 | Banba ................... | F16K 17/363 137/38 |

(Continued)

FOREIGN PATENT DOCUMENTS

GB            154948 A   *  11/1920  ............. F16K 31/53

*Primary Examiner* — Seth W. Mackay-Smith
(74) *Attorney, Agent, or Firm* — Stinson LLP

(57) ABSTRACT

A faucet connector comprises a pipe set having one or more branch pipes connected to a main connecting pipe. The faucet connector also comprises one or more valves each disposed with a water stoppage mechanism and a driving element. A casing set is disposed with one or more than one rotational base. One or more knobs each has a handle and a driving element and respectively and rotationally fits onto the corresponding rotational base. The driving element of each of the knobs is respectively linked to the driving element of the corresponding valve, and a pivot of each of the knobs is inclined at an angle with a pivot of the corresponding valve.

11 Claims, 7 Drawing Sheets

(56) References Cited

U.S. PATENT DOCUMENTS

| | | | | |
|---|---|---|---|---|
| 5,232,024 A * | 8/1993 | Williams | A61M 39/223 | 137/606 |
| 5,524,822 A * | 6/1996 | Simmons | B05B 17/08 | 137/625.11 |
| 5,908,130 A * | 6/1999 | Chang | B60K 15/0406 | 220/254.4 |
| 6,042,083 A * | 3/2000 | Lee | F16K 31/60 | 251/161 |
| 6,260,580 B1 * | 7/2001 | Shipley | A23L 3/365 | 137/883 |
| 6,363,971 B1 * | 4/2002 | Kaylan | F23N 1/005 | 137/883 |
| 6,446,660 B1 * | 9/2002 | Goni Usabiaga | F16K 1/04 | 137/243.6 |
| 7,584,898 B2 * | 9/2009 | Schmitt | E03C 1/05 | 137/359 |
| D749,701 S * | 2/2016 | Lo | D23/245 | |
| 2003/0015245 A1 * | 1/2003 | Bender | F16K 3/085 | 137/883 |
| 2004/0134297 A1 * | 7/2004 | West | F16D 41/063 | 74/425 |
| 2006/0174946 A1 * | 8/2006 | Kajuch | F16D 3/2057 | 137/360 |
| 2007/0145319 A1 * | 6/2007 | Hoernig | E03C 1/0412 | 251/248 |
| 2012/0048381 A1 * | 3/2012 | MacDuff | F24D 3/1066 | 137/1 |
| 2012/0305820 A1 * | 12/2012 | Bollman | F24C 3/126 | 251/213 |
| 2013/0277448 A1 * | 10/2013 | Liu | F04F 5/461 | 239/11 |
| 2014/0299213 A1 * | 10/2014 | Cheng | F16K 11/24 | 137/883 |
| 2014/0319729 A1 * | 10/2014 | Galati | B29C 45/281 | 264/328.1 |
| 2014/0367598 A1 * | 12/2014 | Bock-Aronson | E03C 1/0412 | 251/248 |
| 2015/0000766 A1 * | 1/2015 | Arizpe | F16L 41/03 | 137/356 |
| 2018/0290362 A1 * | 10/2018 | Skavicus | B29C 45/7306 | |

* cited by examiner

FAUCET CONNECTOR

TECHNICAL FIELD

The present disclosure relates to a faucet connector and more particularly to a faucet connector with valves.

BACKGROUND

In watering equipment for gardening, a connector is used for enabling connection to a faucet. The connector has connecting holes for transporting the water from the faucet to one or more branch pipes. A water outlet is disposed at an end of the branch pipe for enabling connection to a hose. The hose transports the water to a sprinkler disposed at an end. Each of the branch pipes is disposed with a valve for respectively controlling the flowing or stopping of water from the branch pipes, and controlling the water flow volume.

The water outlet direction of a typical faucet is usually facing downward. The connector fitted onto the faucet is always disposed at a level lower than the faucet. The valve is usually disposed in perpendicular to the branch pipe, and an end face of the valve is disposed in perpendicular to the ground. Therefore, during operation, users have to bend down for turning the valves. When the users have to view the valve angle in order to control the water flow volume, they will have to bend down or squat down to look at the end face of the valve and to operate.

In view of the above problems, a faucet connector of the present invention is provided.

SUMMARY

Aspects of the invention provide a faucet connector with water volume-control knobs that are facing the user.

Briefly, a faucet connector embodying aspects of the present invention comprise a pipe set composed of a main connecting pipe and one or more branch pipes. The main connecting pipe has a water inlet connecting to an inner passage and the branch pipes are connected to the main connecting pipe. Each of the branch pipes is disposed with a valve port and a water outlet. The faucet connection further comprises one or more valves for respectively and rotationally coupling with the corresponding valve port, each of the valves being disposed with a water stoppage mechanism and a driving element, and a casing set disposed with one or more than one rotational base, each of the rotational bases having an opening; and one or more than one knob. Moreover, each of the knobs has a handle and a driving element and respectively and rotationally fits onto the corresponding rotational base. The driving element of each of the knobs respectively links with the driving element of the corresponding valve, and a pivot of each of the knobs is inclined at an angle with a pivot of the corresponding valve.

In an aspect, the water stoppage mechanism comprises a first water stoppage ring.

In another aspect, the water stoppage mechanism further comprises two second water stoppage rings disposed by two sides of the first water stoppage ring.

In yet another aspect, the driving element of the valve and the driving element of the knob are bevel gears.

In yet another aspect, the valve is disposed with a fasten and stop end for fastening at an end of the valve port and preventing from detaching.

In yet another aspect, the knob has two elastic plates with an end disposed with a fasten and stop end for fastening at the rotational base of the casing set and preventing from detaching.

In yet another aspect, the casing set is composed of a front casing and a back casing, and the rotational base is disposed on the front casing.

In yet another aspect, end faces of the valve ports of the branch pipes are disposed with limitation grooves, and the valves have stop blocks disposed in the limitation grooves.

In yet another aspect, a difference angle between the pivots of the knobs and the pivots of the valves is between approximately 15 and approximately 90 degrees.

In yet another aspect, the difference of an angle between the pivots of the knobs and the pivots of the valves is approximately 40 degrees.

Based on the above disclosure, the perpendicularly connected adjusting knobs of the faucet connector of the present invention are turned approximately 15 to approximately 90 degrees upwardly for easy operation for the user.

Aspects of the present invention will become more fully understood by reference to the following detailed description thereof when read in conjunction with the attached drawings.

BRIEF DESCRIPTION OF THE DRAWINGS

Corresponding reference characters indicate corresponding parts throughout the drawings.

DETAILED DESCRIPTION

Figure 1:
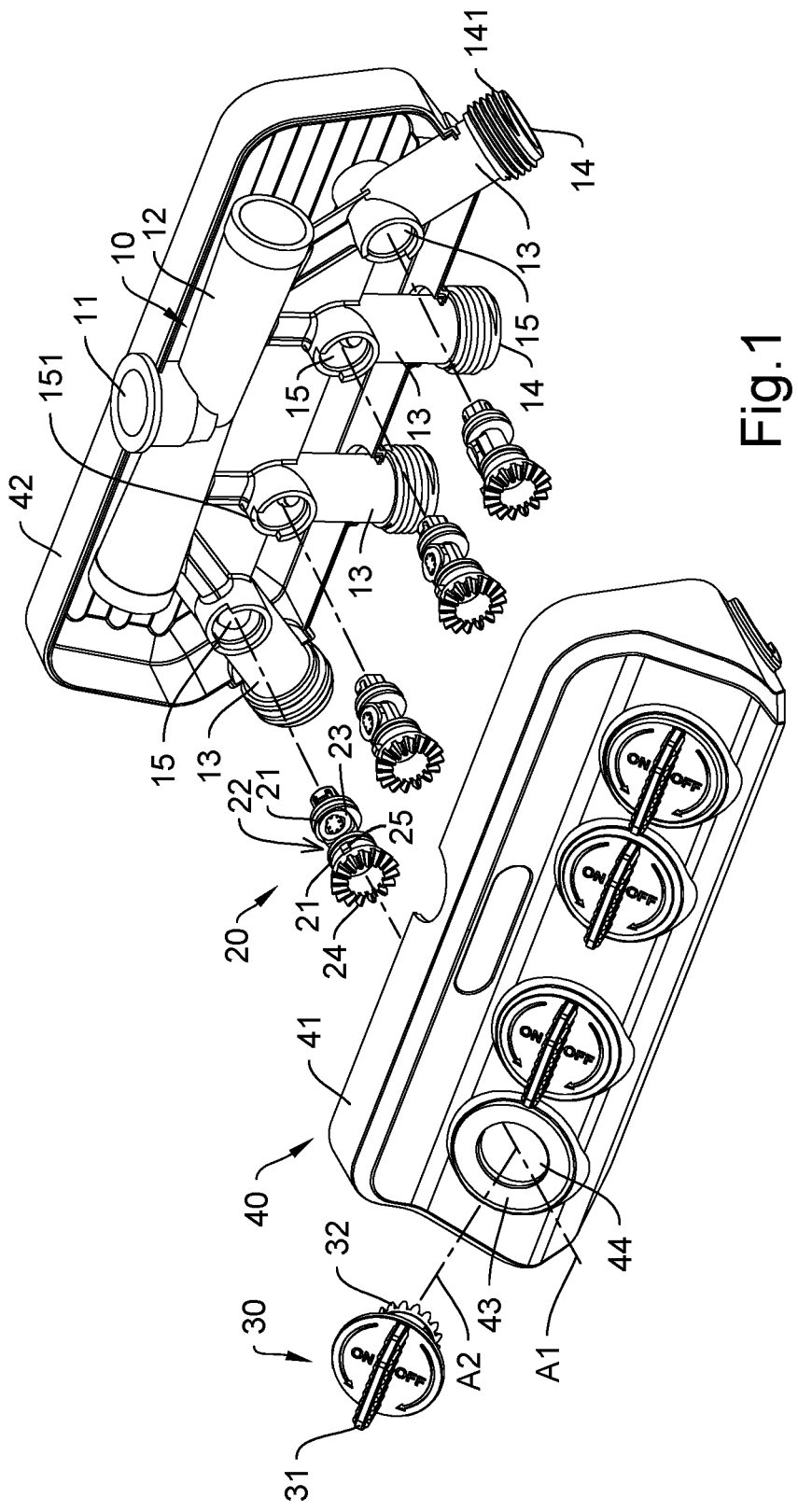
FIG. 1 is a perspective exploded view of a preferred embodiment of a faucet connector of the present invention.

Please refer to FIG. 1. FIG. 1 is a perspective exploded view of a preferred embodiment of a faucet connector of the present invention. The faucet connector comprises a pipe set 10. The pipe set 10 comprises a main connecting pipe 12 and one or more than one branch pipe 13. The main connecting pipe 12 in the illustrated embodiment is a horizontally disposed tubular body with an inner passage. A water inlet 11 disposed above the main connecting pipe 12 is linked to the inner passage. The water inlet 11 is mainly used for enabling connection to a faucet. Accessories for fastening the water inlet 11 to the faucet are not shown in the figure. The branch pipes 13 are connected to the main connecting pipe 12 from downward to upward. The branch pipes 13 are tubular bodies with inner passages. The passages of the branch pipes 13 are connected to the passage of the main connecting pipe 12. Each of the branch pipes 13 has a valve port 15 and a water outlet 14. The valve port 15 is intersected with the passage of the branch pipe 13. A limitation groove 151 is disposed at an end face of the valve port 15. The water outlet 14 is connected with an external hose for transporting the water to a sprinkler. Preferably, a threading 141 is disposed on an outer circumference of the water outlet 14 for firmly coupling with the branch pipe 13 by using a screw cap of a hose connector.

Figure 3:
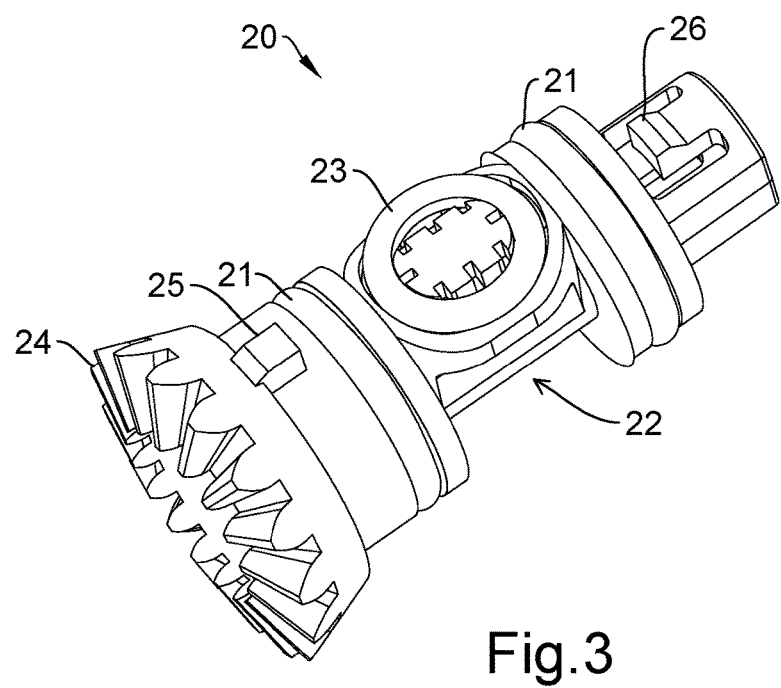
FIG. 3 is a perspective view of a valve of the preferred embodiment of the faucet connector of the present invention.

One or more than one valve 20 is respectively and rotationally coupled with the valve ports 15. Each of the valves 20 is disposed with a water stoppage mechanism. There are various forms of the valves 20, and the types of the valves 20 are not limited in the present invention. The valves 20 are used for closing, opening, or adjusting the passages of the branch pipes 13. Please refer to FIG. 3 for a preferred embodiment of the valve 20. The valve 20 is mainly cylindrical. A cylindrical surface of the valve 20 is disposed with the water stoppage mechanism. The water stoppage mechanism comprises a first water stoppage ring 23 and two second water stoppage rings 21. The first water stoppage ring 23 is used for closing or opening the passage of the branch pipe 13.

Figure 7:
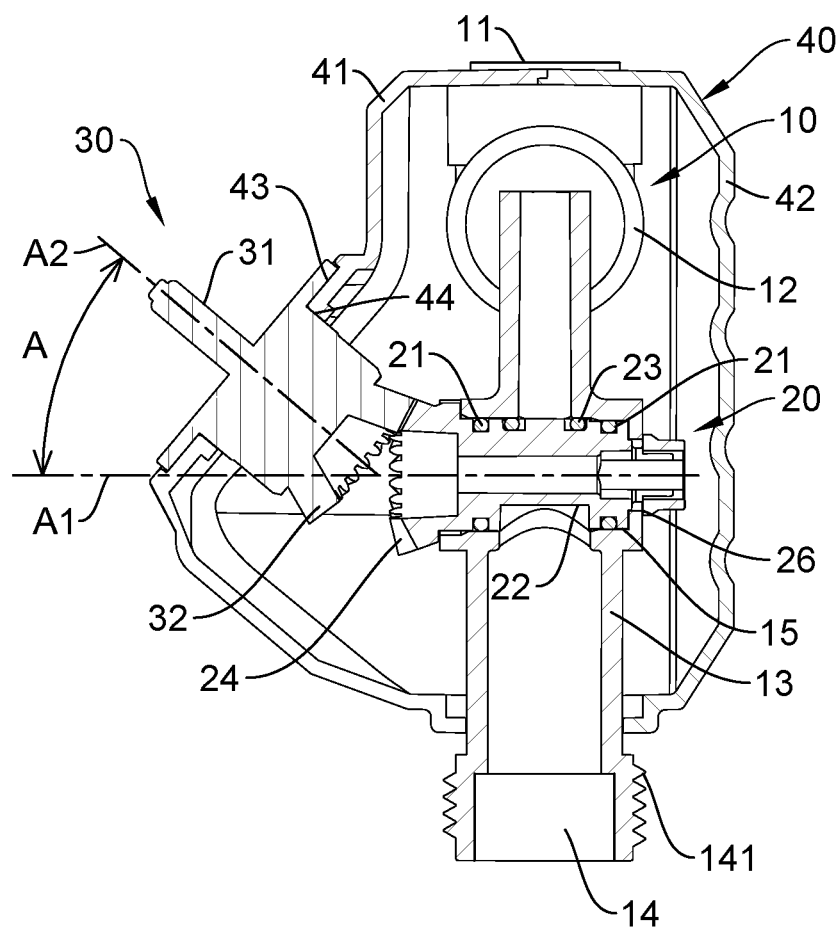
FIG. 7 is a sectional view of the preferred embodiment of the faucet connector of the present invention along B-B direction in FIG. 6.

In this preferred embodiment, the first water stoppage ring 23 is preferably disposed with a plastic collar for enhancing the sealing effect. The second water stoppage rings 21 are respectively disposed by two sides of the first water stoppage ring 23. The second water stoppage ring 21 is a plastic collar made of silicone rubber or rubber. The second water stoppage ring 21 can prevent water leaking from the valve port 15. A driving element 24 is disposed at an end of the valve 20. The driving element 24 is preferably a bevel gear. A fasten and stop end 26 is disposed at another end of the valve 20. After the valve 20 is pressed into the valve port 15 for assembly, the fasten and stop end 26 is fastened at an end of the valve port 15 for preventing detachment from the valve port (as shown in FIG. 7). The valve 20 has a stop block 25 configured to be disposed in the limitation groove 151 (as shown in FIG. 1) so that the degree to which valve 20 can be turned is limited.

A casing set 40 is used for accommodating the pipe set 10, the one or more than one branch pipe 13 and the corresponding valves 20. Preferably, the casing set 40 is composed of a front casing 41 and a back casing 42. The casing set 40 is disposed with indentations for the water inlet 11 of the pipe set 10 and the water outlets 14 of the branch pipes 13 to extend outside the casing set 40. The casing set 40 is disposed with one or more than one rotational base 43. Preferably, the rotational bases 43 are disposed on the front casing 41. Each of the rotational bases 43 has an opening 44.

Figure 2:
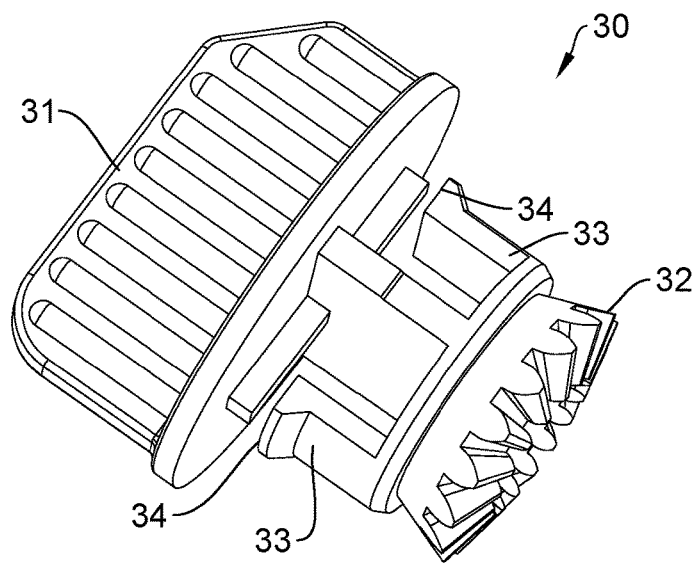
FIG. 2 is a perspective view of a knob of the preferred embodiment of the faucet connector of the present invention.

One or more than one knob 30, each of the knobs 30 has a handle 31 and a driving element 32. The handle 31 allows the user to turn the knob 30 easily. Please refer to FIG. 2. The handle 31 of the knob 30 is in a platy shape. It is to be understood the handle 31 can be formed in other shapes such as a star or a drum stick shape. The driving element 32 disposed at a bottom of the knob 30 is preferably a bevel bear. The knob 30 further has two elastic plates 33 with an end disposed with a fasten and stop end 34 for fastening at the rotational base 43 of the casing set 40 and preventing from detaching. Please refer to FIG. 7. The knobs 30 are respectively and rotationally fitting onto the rotational bases 43. The driving elements 32 of the knobs 30 respectively go through the openings 44 and engage with the driving elements 24 of the valves 20. Therefore, the knobs 30 and the valves 20 are linked and turned together. Turning the knob 30 will drive the valve 20 to turn also. By engaging the driving element 32 with the driving element 24 of the valve 20, a non-coaxial setup with a difference angle A is formed between a pivot A2 of the knob 30 and a pivot A1 of the valve 20. The turning axis is changed. The pivots A2 of the knobs 30 are inclined at an angle with the pivots A1 of the corresponding valves 20. The inclined difference angle A is preferably between approximately 15 and approximately 90 degrees. As shown in the figure, the difference angle A is approximately 40 degrees. Thereby, the operational plane of the knob 30 is changed from the horizontal direction of the valve 20 to approximately 40 degrees upward.

Figure 4:
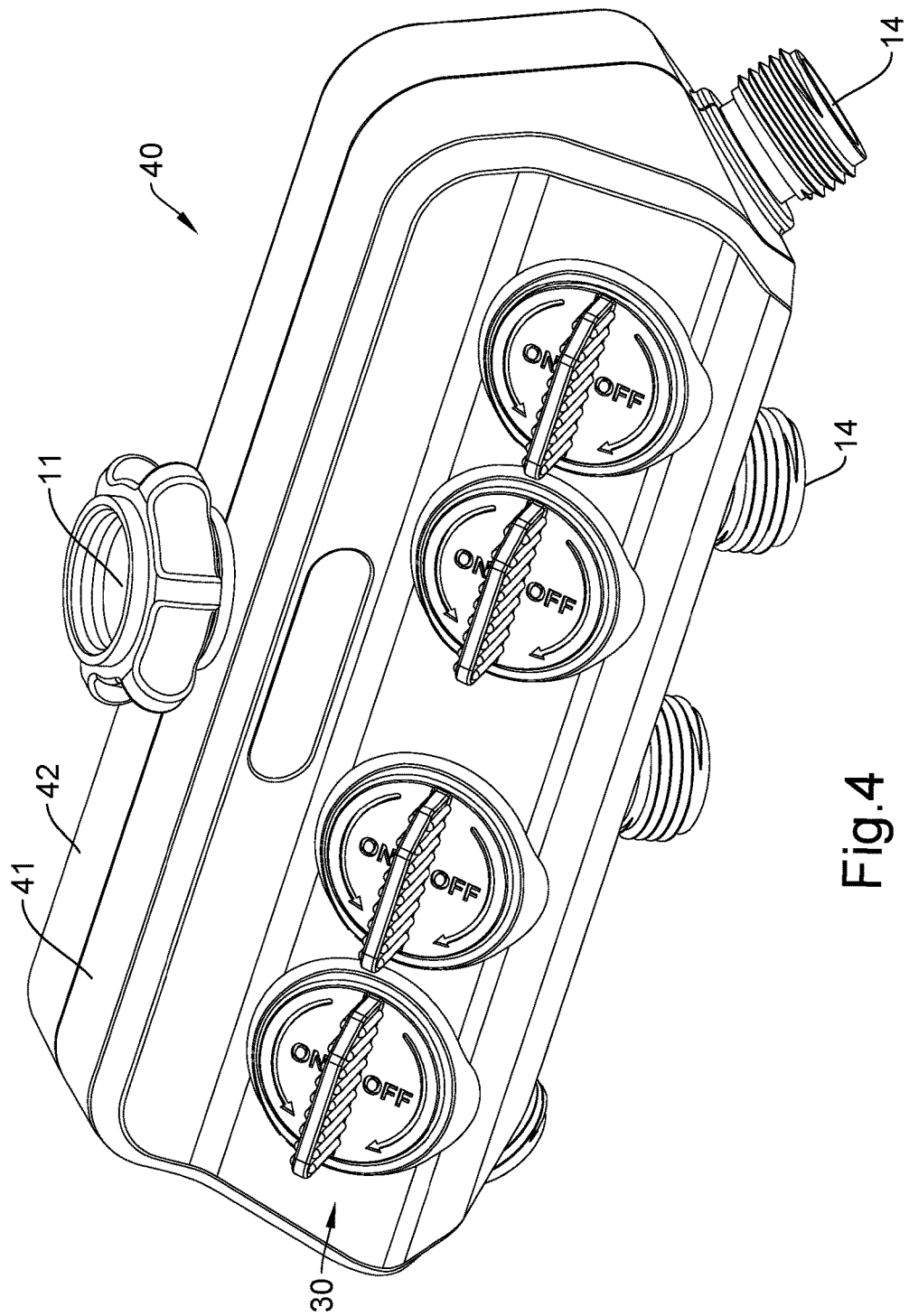
FIG. 4 is a perspective assembly view of the preferred embodiment of the faucet connector of the present invention.

Please refer to FIG. 4. FIG. 4 is a perspective assembly view of the preferred embodiment of the faucet connector of the present invention. After the faucet connector is assembled according to the above descriptions, the exterior looks compact with the pipe set 10 enclosed inside the casing set 40. The water inlet 11 is connected with the faucet (not shown) by using other accessories. The water outlets 14 are roughly facing downward for connecting with hoses. Fronts of the knobs 30 are inclined upwardly for easy viewing and operation for the user.

Figure 5:
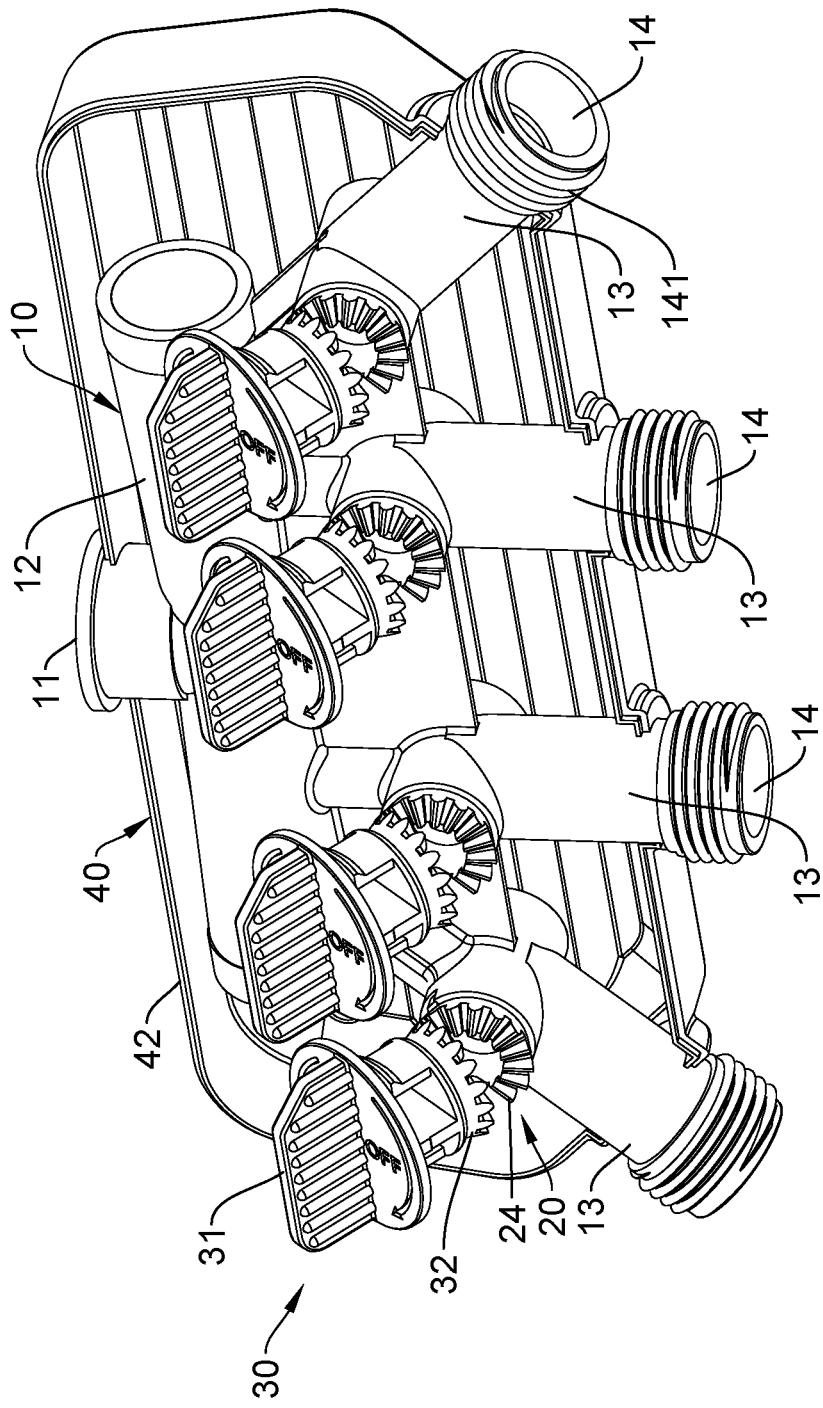
FIG. 5 is a partial perspective assembly view of the preferred embodiment of the faucet connector of the present invention.

Please refer to FIG. 5. FIG. 5 is a partial perspective assembly view of the preferred embodiment of the faucet connector of the present invention. The front casing 41 is omitted. It is seen clearly that the driving elements 32 of the knobs 30 are engaged in an offset manner with the driving elements 24 of the valves 20 at an angle by using the bevel gears. Thereby, the operational planes of the knobs 30 are inclined upwardly for easy viewing and operation for the user. Besides that the driving element 24 and the driving element 32 are bevel gears in this embodiment, they are also embodied with other inter-engaging and driving means such as friction wheels.

Figure 6:
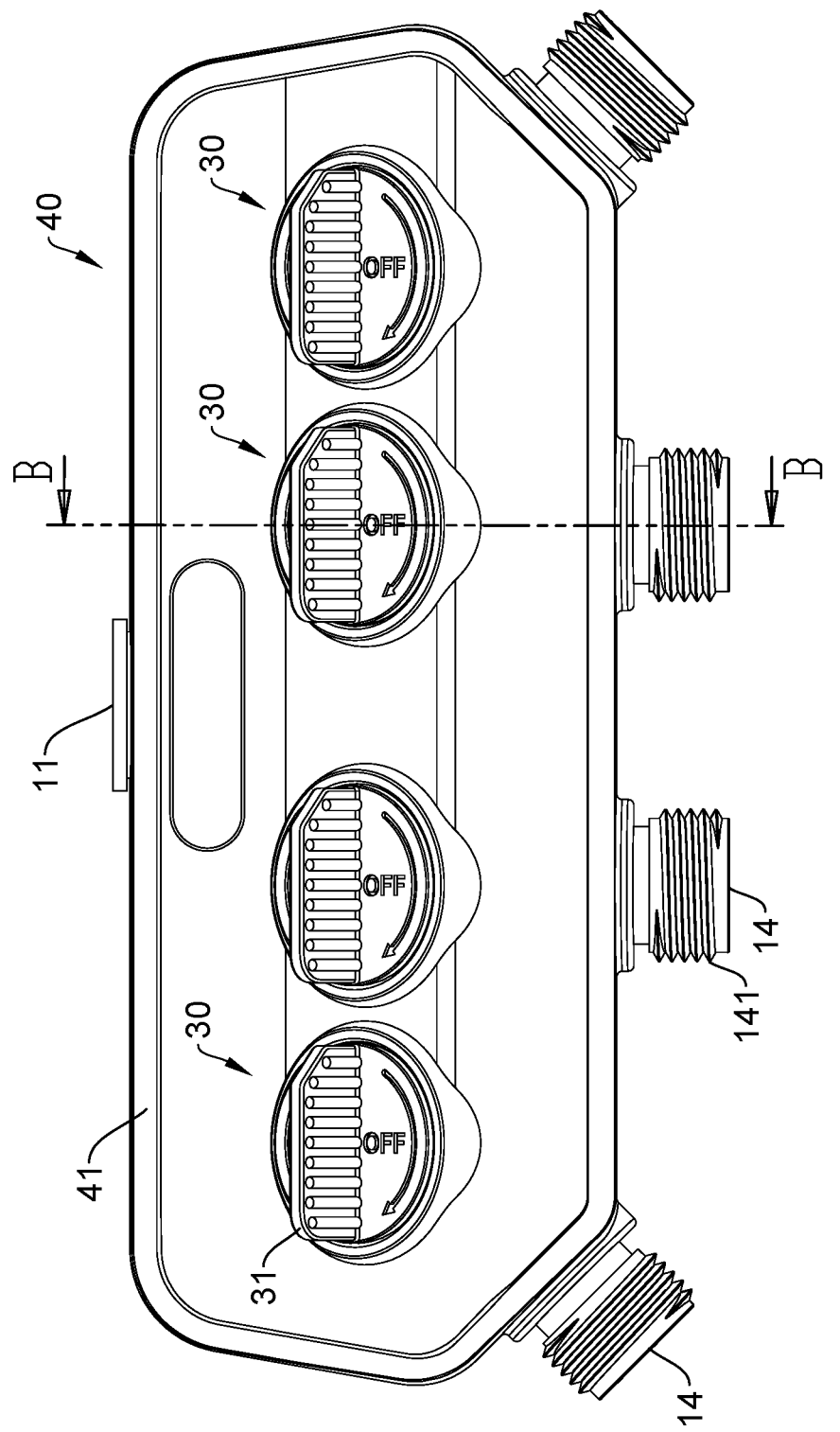
FIG. 6 is a front assembly view of the preferred embodiment of the faucet connector of the present invention.

Please refer to FIGS. 6 and 7. The difference angle A between the pivot A2 of the knob 30 and the pivot A1 of the valve 20 in this embodiment is approximately 40 degrees. If the difference angle A is below approximately 15 degrees, it is close to the horizontal level which is not suitable for the objective of the present invention. Therefore, the difference angle A is preferably between approximately 15 and approximately 90 degrees. As shown in the figure, the difference angle A is approximately 40 degrees. Thereby, the operational plane of the knob 30 is changed from the horizontal direction of the valve 20 to approximately 40 degrees upward.

Figure 8:
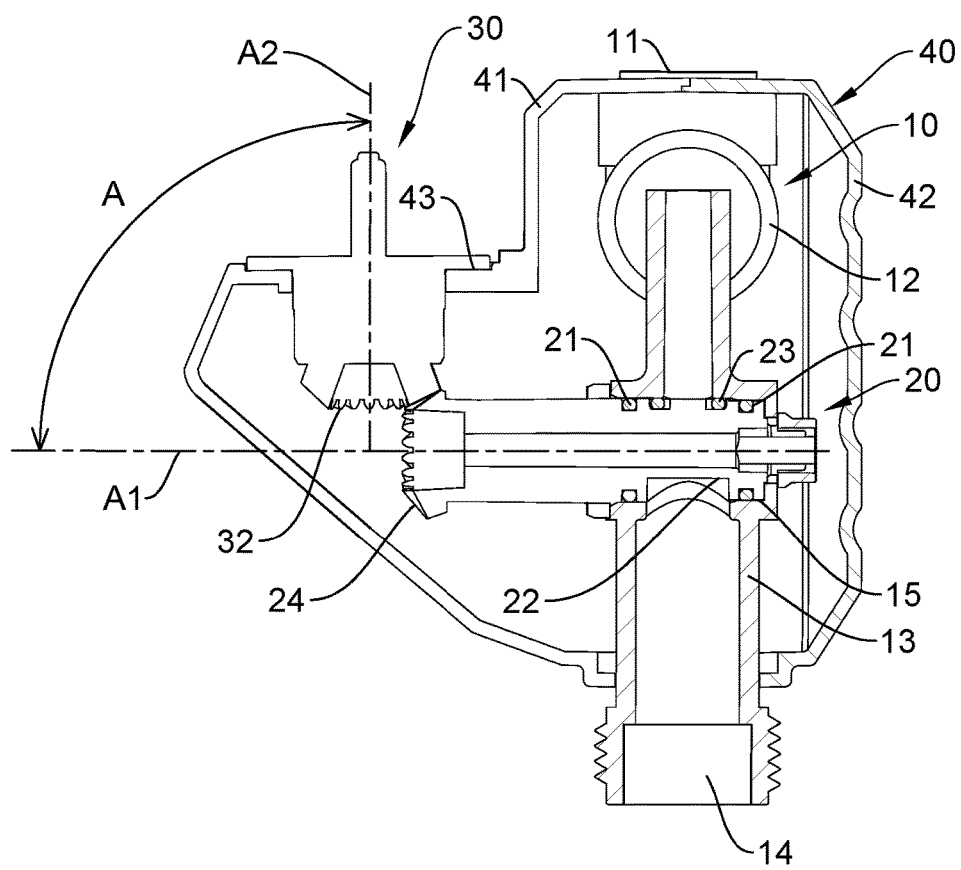
FIG. 8 is sectional view of another preferred embodiment of the faucet connector of the present invention.

Please refer to FIG. 8. FIG. 8 is sectional view of another preferred embodiment of the faucet connector of the present invention. The largest difference angle A between the pivot A2 of the knob 30 and the pivot A1 of the valve 20 in this embodiment is approximately 90 degrees. Thereby, the user can operate the knob 30 vertically from the top.

According to the above descriptions of the embodiments, the faucet connector of the present invention allows a difference angle A to form between the pivot A2 of the knob 30 and the pivot A1 of the valve 20. The difference angle A is between 15 and 90 degrees. Thereby, the ergonomic design allows the user to view and apply force easily.

In order to further explain the structures and characteristics of the present invention, as well as the technical means and expected effects; the ways of usage are specifically described hereunder for in-depth understanding.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A faucet connector, comprising:
   a pipe set having a main connecting pipe and one or more branch pipes, the main connecting pipe having a water inlet connecting to an inner passage, the one or more branch pipes being connected to the main connecting pipe, each of the branch pipes being disposed with a valve port and a water outlet;
   one or more valves for respectively and rotationally coupling with the one or more valve ports, each of the valves being disposed with a water stoppage mechanism and a first driving element;
   a casing set disposed with one or more rotational bases, each of the rotational bases having an opening; and
   one or more knobs, each of the knobs having a handle and a second driving element, each of the knobs being respectively and rotationally fitted onto the corresponding rotational base, the second driving element of each of the knobs being respectively linked to the first driving element of the corresponding valve, and a pivot of each of the knobs being inclined at an angle with a pivot of the corresponding valve;
   wherein each of the knobs has an elastic plate with an end disposed with at least one fasten and stop end for fastening at the rotational base of the casing set and preventing detachment.

2. The faucet connector as claimed in claim 1, wherein the water stoppage mechanism comprises a first water stoppage ring.

3. The faucet connector as claimed in claim 2, wherein the water stoppage mechanism further comprises two second water stoppage rings disposed by two sides of the first water stoppage ring.

4. The faucet connector as claimed in claim 1, wherein the first driving element of the valve and the second driving element of the knob are bevel gears.

5. The faucet connector as claimed in claim 4, wherein the casing set is composed of a front casing and a back casing, and the rotational base is disposed on the front casing.

6. The faucet connector as claimed in claim 5, wherein each of the valves has a stop block disposed in a limitation groove defined at an end face of each of the valve ports intersected with each of the branch pipes, respectively.

7. The faucet connector as claimed in claim 6, wherein an inclined angle between the pivots of the knobs and the pivots of the valves is between approximately 15 and approximately 90 degrees.

8. The faucet connector as claimed in claim 7, wherein an inclined angle between the pivots of the knobs and the pivots of the valves is approximately 40 degrees.

9. The faucet connector as claimed in claim 8, wherein a threading is disposed on an outer circumference of the water outlets of the branch pipes.

10. The faucet connector as claimed in claim 1, wherein the valve is disposed with a fasten and stop end for fastening at an end of the valve port and preventing detachment.

11. The faucet connector as claimed in claim 1, wherein the knob has two elastic plates.

\* \* \* \* \*